United States Patent Office 2,731,359
Patented Jan. 17, 1956

2,731,359

REFRACTORY FIBER BODY AND METHOD OF MAKING SAME

Kenneth C. Nicholson, Niagara Falls, N. Y., assignor to The Carborundum Company, Niagara Falls, N. Y., a corporation of Delaware No Drawing. Application August 22, 1952,
Serial No. 305,920

15 Claims. (Cl. 117—16)

This invention relates to refractory fiber products and to methods for their manufacture. More particularly, it is concerned with refractory fiber products suitable for use as a light-weight insulating material, filtering media and the like comprising a body or mass of refractory fibers held together in sheet or matted form by an inorganic refractory binder.

Inorganic fibers, variously referred to in the art as mineral wool, slag wool, fibrous glass and the like, have been proposed for use as insulating blankets, filtering media and the like in which various resinous binders and other materials have been incorporated within the product to impart handling strength and durability to the finished product. These various products of the prior art have been limited to applications involving relatively low temperatures and somewhat restricted corrosive or erosive conditions not only because of the limited refractoriness of the fibers themselves but also because of the relatively low resistance to higher temperatures of the various bonding agents embodied in the product. There has, therefore, been a demand for a refractory fibrous product of adequate strength and durability for sustained use at high temperatures and/or use under severely corrosive conditions.

It is an object of the present invention to provide fibrous products in mat or sheet form which are of relatively high resistance to high temperatures and are capable of use at temperatures considerably above those at which previous products have been capable of use.

It is a further object to provide inorganic fibrous products in mat or sheet form in which both the fibers and the bond are capable of use at relatively high temperatures.

It is a further object to provide a new and improved fibrous product for high temperature insulation purposes superior in heat resistance to the various glass fiber products of the prior art.

I have discovered that a highly refractory, fibrous material in sheet or mat form suitable for use, inter alia, as a refractory insulating body and having highly superior properties in respect of resistance to high temperatures and various chemically corrosive conditions can be produced by charging or impregnating a body of intermingled fibrous material of adequate refractoriness with a silicon metal such as elemental silicon and alloys thereof such as ferrosilicon or ferromanganese silicon in powdered form and heating the thusly charged or impregnated body in a non-oxidizing atmosphere whereby the silicon metal is converted to an oxygen-free compound of silicon, namely, a highly refractory inorganic silicide. For example, the body of refractory fibers and silicon metal powder can be fired in a non-oxidizing, nitrogenous atmosphere to convert the silicon metal to a bond of nitrogen silicide which may be otherwise referred to as silicon nitride. Alternatively, the same body of refractory fibers and silicon metal can be fired in a non-oxidizing, carbonaceous atmosphere such as an atmosphere of hydrocarbons or carbon monoxide in which case the silicon metal is converted to carbon silicide, otherwise more commonly referred to as silicon carbide. The carbon silicide (or silicon carbide) thusly formed is of cubic crystal structure as identified by X-ray diffraction analysis. Or, the refractory fiber/silicon metal body can be fired in a non-oxidizing atmosphere containing both nitrogen and carbonaceous gas or vapors such as carbon monoxide in which case the bond formed is a mixture of silicides of carbon and nitrogen. A satisfactory mixture of carbon monoxide and nitrogen is obtained by passing air through carbon which has been heated to a temperature in excess of about 1000° C.

In carrying out the present invention, it is first essential that a refractory fibrous material be selected which is capable of standing up under the temperatures required for converting the metallic bonding material to the desired silicide, in other words a fibrous material which is capable of standing up under temperatures in the neighborhood of 1200° to 1400° C. One such refractory fibrous material which I have found highly satisfactory for the present purposes is that described fully in McMullen U. S. Patent No. 2,557,834. Briefly, the fibrous material of the McMullen patent is composed essentially of approximately equal parts of aluminum oxide and silica together with a small amount in the neigihborhood of 1½ to 6% of a modifying agent such as borax glass. A typical oxide analysis of such a refractory fiber which I have successfully used in carrying out the present invention is as follows:

| | Percent by weight |
|---|---|
| Aluminum oxide ($Al_2O_3$) | 52.67 |
| Silica ($SiO_2$) | 45.77 |
| Boric oxide ($B_2O_3$) | 1.06 |
| Sodium oxide ($Na_2O$) | 0.50 |

Although I have set forth above a specific refractory fiber composition suitable for the present purpose it is not intended to be limited to the specific composition or compositions covered by the above-mentioned patent since other refractory fibers of comparable refractoriness can be employed with equally satisfactory results, such as fused silica fibers or refractory fibers containing other oxidic material.

After selecting the desired refractory fiber the basic fibrous material is fabricated by any of the methods well known in the art to form a body or mass of intermingled fibers in bat or matted form, or by wet paper making methods the refractory fibrous material is felted into a thinner mass of fibrous material resembling paper or similar sheet material, one or more layers of which can be used to constitute the final product.

The silicon metal which is to constitute the source of the silicide bond can be introduced into the mass of refractory fibers during the process of forming the refractory fibrous body or it can be introduced into the mass of refractory fibers subsequent to formation of the latter. The silicon metal can be introduced in dry form by sifting into the loosely woven product or it can be introduced in the form of a slurry or fluid suspension in a suitable liquid medium which is flowed into the fibrous body, in which case the liquid medium is volatilized off in the later operation of firing the material to convert the silicon metal to the desired silicide.

The silicon-charged refractory fibrous mass or body is placed in a furnace or oven and heated in a non-oxidizing atmosphere to the temperature required to convert the silicon to the desired silicide which bonds itself to the fibers at their points of intersection to hold them together and impart the requisite amount of strength and durability to the final product. For example, in forming a silicide bonded refractory fibrous product in which the refractory fibers are held together by means of a nitrogen silicide bond, a fibrous body of refractory fibers charged with the desired amount of silicon metal is placed in a furnace chamber, the normal atmosphere evacuated and replaced with a non-oxidizing, nitrogenous atmosphere such as an atmosphere of nitrogen or ammonia and the furnace chamber heated up to a temperature of 1350° to 1400° C. in a flowing stream of the nitrogenous gas or vapor to cause the silicon to combine with the nitrogen and form nitrogen silicide (silicon nitride) which will bond together the refractory fibers. In firing to form a nitrogen silicide bond it is usually necessary to hold the furnace chamber at the maximum temperature or close thereto for a period of several hours in order to bring about a reasonably thorough conversion to the silicide since that reaction is relatively slow.

According to the second modification of the present invention wherein the silicide bond is carbon silicide, otherwise known as silicon carbide, the body of refractory fibers containing the silicon metal is placed in a furnace chamber and the normal atmosphere replaced by a non-oxidizing, carbonaceous atmosphere such as an atmosphere of carbon monoxide which is flowed through the furnace in a continuous stream throughout the firing operation. The furnace chamber is brought to a temperature of approximately 1250° C. whereupon the silicon metal is converted to carbon silicide which bonds the fibers together at their intersections to form a strong and durable body. This modification has an advantage over the previously described form of the invention in that in the case of formation of a carbon silicide bond the reaction is relatively rapid and it is only necessary to hold the material at the maximum temperature a short period of time in the order of magnitude of a few minutes in order to bring about the necessary reaction to form the carbon silicide bond.

In order that the invention may be more fully understood, the following specific examples of the making of refractory fibrous products are set forth by way of illustration.

Example I

An insulating blanket suitable for use as an insulation material and composed of a loosely interwoven mass of refractory fibers and nitrogen silicide bond approximately 2" in thickness is made as follows. A bat of the refractory fibers of the desired thickness is laid down or otherwise collected upon a suitable support in any of the numerous ways available in the art and the resulting fibrous mass loaded or charged with approximately 20% by weight of silicon powder of 200 mesh particle size and finer and the resulting body of refractory fibers and silicon metal placed in a furnace chamber. The normal atmosphere of the furnace is replaced with nitrogen after which the temperature is raised to 1350° to 1400° C. and while maintaining a flowing stream of nitrogen through the furnace the maximum temperature of 1350° to 1400° C. is maintained for 5 hours after which the temperature is lowered and the resulting product removed. Examination of the final product shows that the silicon has been converted to nitrogen silicide (silicon nitride) which bonds the refractory fibers at their points of intersection and imparts to the resulting mass of refractory fibers the requisite strength. Furthermore, both the refractory fibers and the resulting silicide bond are of high refractoriness, permitting the use of the resulting insulating body at temperatures considerably in excess of those temperatures of use which are permissible with previously known fibrous bodies.

Example II

Refractory insulating blankets can be made by a process similar to that set forth in Example I above except that the silicon-charged fibrous body is fired in an atmosphere of carbon monoxide at a maximum temperature of 1250° C. which is held for 15 minutes only. The resulting fibrous body is composed of the refractory fibers held together at their intersections by a carbon silicide bond. The carbon silicide, otherwise more commonly known as silicon carbide, is of cubic crystalline structure and, like the nitrogen silicide bond of Example I, is of sufficiently high refractoriness to permit the use of the resulting product at relatively high temperatures.

Example III

A felted sheet of refractory fibers such as those used in Example I is formed by usual paper making technique modified in that the furnish from which the paper sheet of fibers is formed is charged with 16% of silicon metal as it is deposited upon its support and prior to extraction of the aqueous suspending medium. The resulting sheet material, resembling paper in form, is placed in a furnace chamber and fired in an atmosphere of nitrogen in the manner described in further detail in Example I whereby the silicon is converted to a nitrogen silicide bond. The resulting sheet material is satisfactory for insulating purposes where it is desired to conserve upon space and the available space is inadequate to permit the use of a more bulky body such as a more loosely matted mass of fibers.

While I have referred herein to the use of silicon, the present invention is intended to include other silicon metals in addition to elemental silicon such as the various silicon alloys high in silicon content, including various ferrosilicon and ferromanganese silicon alloys since these alloys upon heating in non-oxidizing, nitrogenous or carbonaceous atmospheres behave comparably to silicon in that they likewise form a highly refractory silicide bond of the nature described. When the term silicon metal has been used herein and in the claims it is therefore intended to include both elemental silicon and alloys thereof such as ferrosilicon and ferromanganese silicon embodying substantial amounts of silicon.

The various silicide bonded fibrous bodies of the present invention find use not only in various industrial insulating applications but also as insulating materials for guided missile radomes, and as insulation around the hot zones of turbo-jet engines, rocket engines, and the like, where strength combined with light-weight as well as resistance to relatively high temperatures is essential.

In addition to their manifold uses as high temperature insulation materials the producs of the present invention are likewise applicable to many uses as filtering media particularly where it is desired to have a filtering body which is not only resistant to heat but is also resistant to various corrosive and erosive conditions such as, for example, resistance to hot acids and the like. Both the refractory fibers and the silicide bonds are relatively inert chemically and are not as subject to attack as the various organic bonding media heretofore used in forming refractory fiber bodies.

Having described the invention in detail, it is desired to claim:

I claim:

1. A refractory material comprising an intermingled mass of refractory fibers held together by a silicon nitride bond, said refractory fiber being capable of standing up under a temperature of about 1200° C. to 1400° C.

2. A refractory material comprising an intermingled mass of refractory fibers held together by a silicon carbide bond, said refractory fiber being capable of standing up under a temperature of about 1200° C. to 1400° C.

3. As an article of manufacture, a mass of refractory fibers bonded in the form of an integral light-weight porous body in which the fibers are bonded to one another by means of a silicon nitride bond, said refractory fibers being capable of standing up under the temperature of forming said bond.

4. As an article of manufacture, a mass of refractory fibers bonded in the form of an integral light-weight porous body in which the fibers are bonded to one another by means of a bond of cubic silicon carbide, said refractory fibers being capable of standing up under the temperature of forming said bond.

5. As an article of manufacture, a mass of refractory fibers bonded in the form of an integral light-weight porous body in which the fibers are bonded to one another by means of a silicide selected from the group consisting of carbon silicide and nitrogen silicide, said refractory fibers being capable of standing up under the temperature of forming said silicide.

6. A refractory insulating blanket comprising refractory wool fibers and a silicon carbide bond, said refractory fiber being capable of standing up under a temperature of about 1200° C. to 1400° C.

7. As an article of manufacture, a non-woven body of refractory fibers in loosely matted form, said fibers being held together at their points of intersection by a silicide selected from the group consisting of carbon silicide and nitrogen silicide, said refractory fiber being capable of standing up under a temperature of about 1200° C. to 1400° C.

8. As an article of manufacture, a mass of refractory fibers bonded in the form of an integral light-weight porous body in which the fibers are bonded to one another by means of an oxygen-free compound of silicon, said refractory fibers being capable of standing up under the temperature of forming the bond.

9. As an article of manufacture, a mass of refractory fibers bonded in the form of an integral light-weight porous body in which the fibers are bonded to one another by means of an oxygen-free compound of silicon selected from the group consisting of silicon carbide and silicon nitride, said refractory fiber being capable of standing up under a temperature of about 1200° C. to 1400° C.

10. As a new article of manufacture, a light-weight body comprising refractory fibers and a silicide bond therefor, said refractory fibers being capable of standing up under the temperature of forming said bond.

11. A method of making a light-weight refractory body which comprises forming a non-woven mass of refractory fibers which are capable of standing up under a temperature of about 1200° C. to 1400° C., incorporating a silicon powder within said mass of fibers, and heating the resulting mass in a non-oxidizing, nitrogen-containing atmosphere to convert said silicon powder to silicon nitride and thereby bond the refractory fibers together at their points of contact.

12. A method of making a light-weight refractory body which comprises forming a non-woven mass of refractory fibers which are capable of standing up under a temperature of about 1200° C. to 1400° C., incorporating a silicon powder within said mass of fibers, and heating the resulting mass in a non-oxidizing, carbonaceous atmosphere to convert said silicon powder to cubic silicon carbide and thereby bond the refractory fibers together at their points of contact.

13. A method of making a light-weight refractory body which comprises forming a non-woven mass of refractory fibers which are capable of standing up under the temperatures required for converting silicon powder to the desired silicide, incorporating a silicon powder within said mass of fibers, and heating the resulting mass in a non-oxidizing atmosphere selected from the group consisting of a carbonaceous atmosphere and a nitrogen-containing atmosphere to convert the metallic silicon to a silicide bond and thereby bond the refractory fibers together at their points of contact.

14. A method of making a light-weight refractory body which comprises forming a non-woven mass of refractory fibers which are capable of standing up under the temperatures required for converting silicon powder to the desired nitride incorporating a silicon metal powder within said mass of fibers, and heating the resulting mass in a non-oxidizing, nitrogen-containing atmosphere to convert said silicon metal powder to a nitride bond and thereby bond the refractory fibers together at their points of contact.

15. A method of making a light-weight refractory body which comprises forming a non-woven mass of refractory fibers which are capable of standing up under the temperatures required for converting silicon powder to the desired carbide, incorporating a silicon metal powder within said mass of fibers, and heating the resulting mass in a non-oxidizing, carbonaceous atmosphere to convert said silicon metal powder to a carbide bond and thereby bond the refractory fibers together at their points of contact.

References Cited in the file of this patent

UNITED STATES PATENTS 2,618,565    Nicholson _____ Nov. 18, 1952